US008859102B2

(12) United States Patent
Fan et al.

(10) Patent No.: US 8,859,102 B2
(45) Date of Patent: Oct. 14, 2014

(54) BARRIER STRUCTURE AND METHOD FOR MAKING

(75) Inventors: Hua Fan, Nashua, NH (US); Peter A. Kirk, II, Manchester, NH (US); Robert C. Hobbs, Merrimack, NH (US); Anne B. Hardy, Acton, MA (US); Michael J. Lussier, Bedford, NH (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 610 days.

(21) Appl. No.: 12/761,824

(22) Filed: Apr. 16, 2010

(65) Prior Publication Data

US 2010/0266852 A1 Oct. 21, 2010

Related U.S. Application Data

(63) Continuation-in-part of application No. 12/363,490, filed on Jan. 30, 2009.

(60) Provisional application No. 61/113,844, filed on Nov. 12, 2008.

(51) Int. Cl.
*B29C 71/02* (2006.01)
*B32B 38/00* (2006.01)
(Continued)

(52) U.S. Cl.
CPC ......... *B32B 38/0008* (2013.01); *B29K 2027/16* (2013.01); *B29C 66/026* (2013.01); *B29L 2009/00* (2013.01); *B29K 2077/00* (2013.01); *B32B 2327/12* (2013.01); *B29C 65/5021* (2013.01); *B29C 66/919* (2013.01);
(Continued)

(58) Field of Classification Search
USPC ................... 428/58, 421, 422, 500, 543, 704; 156/157, 272.6, 308.4, 309.9
See application file for complete search history.

(56) References Cited

U.S. PATENT DOCUMENTS

| | | | |
|---|---|---|---|
| 2,906,658 | A | 9/1959 | Doban |
| 3,030,290 | A | 4/1962 | Ryan, Jr. |

(Continued)

FOREIGN PATENT DOCUMENTS

| | | | | |
|---|---|---|---|---|
| CN | 1261306 | A | 7/2000 | |
| EP | 278685 | A2 * | 8/1988 | .............. B32B 27/16 |

(Continued)

OTHER PUBLICATIONS

International Search Report mailed Sep. 9, 2009 in related case PCT/US2009/032711, 1 pg.

(Continued)

*Primary Examiner* — Richard A Huhn
(74) *Attorney, Agent, or Firm* — Abel Law Group, LLP; Chi S. Kim (57) ABSTRACT

The disclosure is directed to a barrier structure including a fluoropolymer layer, a polymeric layer, and an adhesive layer. The barrier structure has a chemical permeation breakthrough detection time greater than about one hour for hazardous chemicals as measured by ASTM F739. The disclosure is further directed to a method of forming the aforementioned barrier structure. The barrier material is designed to be suitable for construction of shelters, clothing, containers and other articles requiring barrier properties.

24 Claims, 2 Drawing Sheets

(51) Int. Cl.

| | |
|---|---|
| *B29C 65/50* | (2006.01) |
| *B32B 27/30* | (2006.01) |
| *B29K 27/00* | (2006.01) |
| *B29C 65/00* | (2006.01) |
| *B29L 9/00* | (2006.01) |
| *B29K 77/00* | (2006.01) |
| *B32B 37/12* | (2006.01) |
| *B29K 23/00* | (2006.01) |
| *B29K 75/00* | (2006.01) |
| *B29K 101/12* | (2006.01) |
| *B29C 35/08* | (2006.01) |
| *B29C 35/04* | (2006.01) |
| *B29K 67/00* | (2006.01) |
| *B29K 101/10* | (2006.01) |
| *B29K 27/12* | (2006.01) |
| *B29K 27/06* | (2006.01) |

(52) U.S. Cl.
CPC ..... *B32B 2037/1253* (2013.01); *B29K 2023/12* (2013.01); *B29K 2023/00* (2013.01); *B29K 2075/00* (2013.01); *B29K 2101/12* (2013.01); *B29C 2035/0827* (2013.01); *B29K 2995/0069* (2013.01); *B32B 2309/02* (2013.01); *B32B 2309/105* (2013.01); *B29C 35/045* (2013.01); *B29C 66/45* (2013.01); *B32B 27/30* (2013.01); *B29C 2035/0877* (2013.01); *B29K 2067/00* (2013.01); *B29K 2101/10* (2013.01); *B32B 37/12* (2013.01); *B29C 66/02* (2013.01); *B29C 65/5057* (2013.01); *B29K 2027/12* (2013.01); *B29K 2027/06* (2013.01)
USPC ............. 428/421; 428/58; 428/422; 428/500; 428/543; 428/704; 156/157; 156/272.6; 156/308.8; 156/309.9

(56) References Cited

U.S. PATENT DOCUMENTS

| | | | | |
|---|---|---|---|---|
| 3,586,821 A | * | 6/1971 | Buob ............................ | 219/243 |
| 3,676,181 A | | 7/1972 | Kowalewski | |
| 4,317,860 A | | 3/1982 | Strassel | |
| 4,317,861 A | | 3/1982 | Kidoh et al. | |
| 4,444,861 A | | 4/1984 | Nogami et al. | |
| 4,549,921 A | | 10/1985 | Wolfe, Jr. | |
| 4,640,865 A | * | 2/1987 | Lancaster et al. ............. | 428/421 |
| 4,714,512 A | * | 12/1987 | House et al. ............... | 156/306.6 |
| 4,883,716 A | | 11/1989 | Effenberger et al. | |
| 4,943,473 A | * | 7/1990 | Sahatjian et al. ............. | 442/289 |
| 4,946,736 A | | 8/1990 | Sassa | |
| 5,075,065 A | | 12/1991 | Effenberger et al. | |
| 5,112,692 A | | 5/1992 | Strassel et al. | |
| 5,322,899 A | | 6/1994 | Grunewalder et al. | |
| 5,427,831 A | * | 6/1995 | Stevens ....................... | 428/36.2 |
| 5,529,830 A | | 6/1996 | Dutta et al. | |
| 5,908,704 A | | 6/1999 | Friedman et al. | |
| 6,183,861 B1 | | 2/2001 | Carroll | |
| 6,306,503 B1 | | 10/2001 | Tsai | |
| 6,726,976 B2 | | 4/2004 | Dimitri | |
| 6,726,979 B2 | | 4/2004 | Friedman et al. | |
| 6,759,129 B2 | | 7/2004 | Fukushi | |
| 6,930,063 B2 | | 8/2005 | Keese | |
| 7,141,303 B2 | | 11/2006 | Clemens et al. | |
| 7,270,870 B2 | | 9/2007 | Hetzler et al. | |
| 2002/0179240 A1 | | 12/2002 | Clemens et al. | |
| 2003/0207118 A1 | | 11/2003 | Fukushi | |
| 2003/0232571 A1 | | 12/2003 | Weinerth | |
| 2004/0144482 A1 | | 7/2004 | Cherpinsky et al. | |
| 2004/0166270 A1 | | 8/2004 | Yoshida et al. | |
| 2004/0229043 A1 | | 11/2004 | Spohn et al. | |
| 2005/0077202 A1 | * | 4/2005 | Blum et al. .................... | 206/528 |
| 2005/0186372 A1 | | 8/2005 | Shah et al. | |
| 2005/0255771 A1 | | 11/2005 | Chetty et al. | |
| 2005/0271867 A1 | | 12/2005 | Hetzler et al. | |
| 2007/0044906 A1 | * | 3/2007 | Park ......................... | 156/272.2 |
| 2009/0197091 A1 | | 8/2009 | Kirk, II et al. | |
| 2010/0119760 A1 | | 5/2010 | Kirk, II et al. | |

FOREIGN PATENT DOCUMENTS

| | | | | |
|---|---|---|---|---|
| EP | 0320258 A1 | 6/1989 | | |
| EP | 0976544 A1 | 4/1998 | | |
| JP | 59-140052 A | 8/1984 | | |
| JP | 62-023751 A | 1/1987 | | |
| JP | H01195041 A | 8/1989 | | |
| JP | 02-196643 A | 10/1989 | | |
| JP | H05-261856 A | 10/1993 | | |
| JP | 07001683 | 1/1995 | | |
| JP | 07228848 A | * 8/1995 | ............. | C09J 127/12 |
| JP | 07299890 | 11/1995 | | |
| JP | H08181522 A | 7/1996 | | |
| JP | H09508079 A | 8/1997 | | |
| JP | 09239923 | 9/1997 | | |
| JP | 2002202675 A | 7/2002 | | |
| JP | 2006-144875 A | 6/2006 | | |
| JP | 2007096575 A | 4/2007 | | |
| JP | 2007-145025 A | 6/2007 | | |
| JP | 2008-501552 A | 1/2008 | | |
| KR | 20070011586 A | 1/2007 | | |
| WO | 92/08609 A2 | 5/1992 | | |
| WO | 9519883 A2 | 7/1995 | | |
| WO | 03037443 A1 | 8/2003 | | |
| WO | 2005002849 A2 | 1/2005 | | |
| WO | 2008/005744 A2 | 1/2008 | | |
| WO | 2009/099965 A2 | 8/2009 | | |
| WO | 2010/056377 A1 | 5/2010 | | |

OTHER PUBLICATIONS

Technical Information Services Search Results, 24 pages, Apr. 20, 2009.
Friedman, M. and Walsh, G. "High Performance Films: Review of New Materials and Trends," Polymer Engineering and Science 2002, vol. 42 (8), pp. 1756-1788.
Bergna et al. (eds.), "Colloidal Silica, Fundamentals and Applications," CRC Press, Boca Rato, FL, 2006, p. 163-164.
International Search Report mailed Sep. 7, 2009 in related case PCT/US2009/032669, 1 pg.
"Standard Test Method for Permeation of Liquids and Gases through Protective Clothing Materials under Conditions of Continuous Contact", ASTM F739-07, dated Jan. 1, 2007, pp. 169-180, XP009165094.
"Shelter-Rite High Performance 8028 Architectural Fabric", Seaman Corporation, 2001, XP002688118, Retrieved from the Internet: URL:http://architecturalfabrics.com/downloads/product-data/8028_fabric_test_results.pdf [retrieved on Nov. 28, 2012].
Alphonsus V. Pocius, "Adhesion and Adhesives Technology: An Introduction". p. 153, Chemical Industry Press, dated Jan. 31, 2005. English Translation Attached.
Technical Search, dated Nov. 21, 2007, 3 pages.

* cited by examiner

BARRIER STRUCTURE AND METHOD FOR MAKING

CROSS-REFERENCE TO RELATED APPLICATIONS

The present application is a continuation in part application of U.S. patent application Ser. No. 12/363,490, filed Jan. 30, 2009, entitled "BARRIER STRUCTURE AND METHOD FOR MAKING," naming inventors Peter A. Kirk, II., Ruth A. Jamke, Robert G. Pleydon, and Jiri George Drobny, which claims priority from U.S. Provisional Patent Application No. 61/113,844, filed Nov. 12, 2008, entitled "BARRIER STRUCTURE AND METHOD FOR MAKING," naming inventors Peter A. Kirk, II., Ruth A. Jamke, Robert G. Pleydon, and Jiri George Drobny, which applications are incorporated by reference herein in its entirety.

FIELD OF THE DISCLOSURE

This disclosure, in general, relates to barrier structures and methods for making such structures, as well as articles made from these barrier structures and methods for fabricating such articles.

BACKGROUND

Low surface energy polymers, such as fluoropolymers, exhibit good chemical barrier properties, exhibit a resistance to damage caused by exposure to chemicals, have a resistance to stains, demonstrate a resistance to damage caused by exposure to environmental conditions, and typically, form a release surface. While such low surface energy polymers are in demand, the polymers tend to be expensive. In addition, such polymers exhibit low wetting characteristics and given their tendency to form a release surface, adhere poorly with other polymer substrates.

For particular multilayer article applications, manufacturers have turned to high temperature processing and high temperature seaming. For instance, temperatures in excess of 350° F. are typically used. Unfortunately, these high temperatures often exceed the melting or even the degradation temperatures of many desirable substrates and coatings. Accordingly, fluoropolymers have typically been commercially adhered to high melt temperature substrates. These multilayer articles are typically expensive since they are limited to high melt temperature substrates. Commercially, there has been considerable difficulty with fluoropolymer adhesion to low melt temperature substrates, which are often more cost effective.

Hence, it would be desirable to provide both an improved multilayer article as well as a method for manufacturing such a multilayer article.

SUMMARY

In an embodiment, a barrier structure is provided. The barrier structure includes a fluoropolymer layer, a polymeric layer, and an adhesive layer. The fluoropolymer has a major surface, wherein the major surface is surface treated. The polymeric layer overlies the major surface of the fluoropolymer layer. The adhesive layer is disposed between the fluoropolymer and the polymeric layer, wherein the adhesive layer includes a thermoset material. The barrier structure has a chemical permeation breakthrough detection time greater than about one hour for hazardous chemicals as measured by ASTM F739.

A method includes providing a fluoropolymer layer having a first major surface and a second major surface, wherein at least the first major surface of the fluoropolymer is surface treated. The method includes providing an adhesive layer overlying the first major surface of the fluoropolymer, wherein the adhesive layer is a thermoset material and providing a polymeric layer overlying the adhesive layer.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In a particular embodiment, a barrier structure includes a fluoropolymer layer having a major surface. The barrier structure further includes a polymeric layer overlying the major surface. In an embodiment, the fluoropolymer layer may be disposed directly on and directly contacts the first major surface of the polymeric layer without any intervening layer or layers. In an embodiment, an adhesive layer is disposed between the fluoropolymer layer and the polymeric layer.

An exemplary fluoropolymer used to form the fluoropolymer layer includes a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. For example, the fluoropolymer is polytetrafluoroethylene (PTFE). Exemplary fluoropolymers films may be cast, skived, or extruded. In an embodiment, cast and extruded films may include layered structures such that the composition of the surfaces of the film may or may not match the interior, or each other.

Further exemplary fluoropolymers include a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend, mixture, or alloy thereof. In an embodiment, the fluoropolymer may include a copolymer of ethylene tetrafluoroethylene (ETFE). For example, the fluoropolymer may include FEP. In a further example, the fluoropolymer may include a copolymer of tetrafluoroethylene and perfluoropropyl vinyl ether (PFA). In an exemplary embodiment, the fluoropolymer may be a polymer crosslinkable through radiation, such as e-beam. An exemplary crosslinkable fluoropolymer may include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers may be obtained from Daikin (Japan) and DuPont (USA). In particular, FEP fluoropolymers are commercially available from Daikin, such as NP-12X.

In an embodiment, at least one surface of the fluoropolymer may include a C-treatable fluoropolymer. Exemplary C-treatable fluoropolymers include fluorinated ethylene propylene copolymer (FEP), a copolymer of ethylene tetrafluoroethylene (ETFE), a copolymer of tetrafluoroethylene and perfluoropropyl vinyl ether (PFA), a copolymer of ethylene and chlorotrifluoroethylene (ECTFE), a copolymer of tetrafluoroethylene and perfluoromethyl vinyl ether (MFA), poly vinylidene fluoride (PVDF), and a terpolymer including tetrafluoroethylene, hexafluoropropylene, and vinylidenefluoride (THV). In an embodiment, the fluoropolymer has a first major surface and a second major surface where the first and second major surfaces include the same or different C-treatable fluoropolymers. An exemplary PTFE may be obtained from Saint-Gobain Performance Plastics Corporation, such as DF1700 DB.

In an embodiment, the fluoropolymer layer may be treated to improve adhesion of the fluoropolymer layer to the layer it directly contacts. In an embodiment, the treatment may include surface treatment, chemical treatment, sodium etching, use of a primer, or any combination thereof. In an embodiment, the treatment may include corona treatment, UV treatment, electron beam treatment, flame treatment, scuffing, sodium naphthalene surface treatment, or any combination thereof. In an embodiment, the treatment includes C-treatment. For C-treatment, the fluoropolymer layer is exposed to a corona discharge in an organic gas atmosphere, wherein the organic gas atmosphere comprises, for example, acetone or an alcohol. In an embodiment, the alcohol includes four carbon atoms or less. In an embodiment, the organic gas is acetone. In an embodiment, the organic gas is admixed with an inert gas such as nitrogen. The acetone/nitrogen atmosphere causes an increase of adhesion of the fluoropolymer layer to the layer that it directly contacts. In an embodiment, the treatment causes an increase of adhesion of the fluoropolymer layer to the polymeric layer. In an exemplary embodiment, the treatment includes C-treatment of a C-treatable fluoropolymer. An example of the C-treatment is disclosed in U.S. Pat. No. 6,726,979. In a particular embodiment, the treatment includes corona treatment.

In another exemplary embodiment, at least one major surface of the fluoropolymer layer includes colloidal silica. The colloidal silica typically is present in a dispersion at an amount to provide adhesion between the fluoropolymer layer and the layer it directly contacts. In an embodiment, the colloidal silica is present in a dispersion that does not adversely impact the adhesive properties of the colloidal silica. An exemplary colloidal silica dispersion is described in U.S. Pat. No. 6,930,063, hereby incorporated by reference.

Typically, the fluoropolymer layer has a thickness of at least about 0.01 millimeters (mm). For example, the fluoropolymer layer may have a thickness of about 0.02 millimeters to about 0.3 millimeters. In an embodiment, the fluoropolymer layer may have a thickness of about 0.01 millimeters to 0.05 millimeters. In another embodiment, the fluoropolymer layer may have a thickness of about 0.1 millimeters to about 0.3 millimeters.

The polymeric layer overlies the fluoropolymer layer. In an embodiment, the polymeric layer directly contacts the fluoropolymer layer. The polymeric layer includes polymeric materials such as thermoplastics and thermosets. An exemplary polymeric material may include polyamide, polyaramide, polyimide, polyolefin, polyvinylchloride (PVC), acrylic polymer, diene monomer polymer, polycarbonate (PC), polyetheretherketone (PEEK), fluoropolymer, polyester, polypropylene, polystyrene, polyurethane, thermoplastic blends, or any combination thereof. Further polymeric materials may include silicones, phenolics, nylon, epoxies or any combination thereof. In an embodiment, the polymeric layer includes polyvinylchloride. In an embodiment, the polymeric material includes polyurethane. In an embodiment, the polymeric material includes a polyolefin and in a particular embodiment, the polymeric material includes polyethylene such as high density polyethylene (HDPE). In an embodiment, the polymeric material includes a polyamide such as Nylon. In an embodiment, the polymeric material has similar properties to PVC or polyurethane, including, for example, mechanical properties, flammability properties, bondable properties, and the like. Any polymeric layer suitable for contact with a contained fluid or other material is envisioned.

The polymeric layer may possess other properties specific to the intended use. For instance, the polymeric layer may contain polymeric fillers, mineral fillers, metallic fillers, or any combination thereof to change the appearance, abrasion resistance or other physical properties of the polymeric layer. In a particular embodiment, the polymeric layer may possess properties specifically intended for the embodiment when the polymeric layer(s) are the surface layer(s) of the barrier structure. For example, it may be colored in any desired color. It may be textured for appearance or for low surface friction. In an embodiment, the polymeric material may be stronger or more abrasion resistant than the fluoropolymer film underneath, thus maintaining barrier integrity in the face of physical stresses.

Typically, the polymeric layer has a thickness of at least about 0.1 millimeters. For example, the polymeric layer may have a thickness of about 0.2 millimeters to about 2.0 millimeters, such as about 0.2 millimeters to about 1.5 millimeters, such as about 0.2 millimeters to about 1.0 millimeters.

In a particular embodiment, the barrier structure further includes an adhesive layer. An exemplary adhesive layer improves the adhesion of the layers it directly contacts. In an embodiment, the adhesive layer is disposed between the fluoropolymer layer and the polymeric layer without any intervening layers. When a reinforcing layer is present, the adhesive layer may be disposed between the fluoropolymer layer and the reinforcing layer. In an embodiment, the adhesive layer is disposed between the reinforcing layer and the polymeric layer. In an embodiment, adhesive layers are disposed between the polymer layer and the reinforcing layer, and between the reinforcing layer and the fluoropolymer layer.

In an exemplary embodiment, the adhesive layer includes a thermoplastic material or a thermoset material. In an embodiment, the adhesive layer includes a thermoset material. For instance, the thermoset material includes a cross-linkable material. In a particular embodiment, the thermoset material includes a polyurethane, an acrylic, an epoxy, or combination thereof. In an embodiment, the polyurethane is a two-component polyurethane crosslinking system. In an embodiment, the thermoplastic material of the adhesive layer may include thermoplastic elastomers, such as cross-linkable elastomeric polymers of natural or synthetic origin. For example, an exemplary elastomeric material may include silicone, natural rubber, urethane, olefinic elastomer, diene elastomer, blend of olefinic and diene elastomer, fluoroelastomer, perfluoro elastomer, isocyanate, blends, or any combination thereof. In a particular embodiment, the adhesive layer includes polyurethane. Commercially available thermoplastic adhesive materials include polyurethanes 3206D and 3410 available from Bemis Associates. In a further embodiment, the adhesive layer includes a thermoplastic material having a melt temperature not greater than about 300° F. In an embodiment, the adhesive layer includes a thermoplastic material having a melt temperature not greater than about 350° F., such as not greater than about 400° F., such as not greater than about 450° F. In an embodiment, the adhesive layer includes a thermoplastic material having a melt temperature greater than about 500° F. Exemplary adhesive materials that adhere to C-treated fluoropolymer surfaces are described in U.S. Pat. No. 4,549,921, hereby incorporated by reference.

In another embodiment, the adhesive layer includes polyvinylidene fluoride-polyvinyl chloride (PVDF-PVC). In an embodiment, the PVDF and PVC of the adhesive layer are present at a ratio of greater than about 50/50 by weight, such as greater than about 60/40 by weight, such as about 75/25 to about 90/10 by weight, or even 75/25 to about 85/15 by weight.

Typically, the adhesive layer has a thickness of less than 0.3 mm, such as about 0.03 mm. For example, the thickness of the adhesive layer may be in a range of about 0.01 millimeters to about 0.1 millimeters. In an embodiment, the thickness of the adhesive layer is greater than about 0.1 mils.

In an embodiment, a reinforcing layer may be used. The reinforcing layer may be disposed in any position within the barrier structure to provide reinforcement to the structure. In an embodiment, the reinforcing layer may be disposed between the fluoropolymer layer and the polymeric layer. In another embodiment, the reinforcing layer may overlie the polymeric layer. In an embodiment, the reinforcing layer may be substantially embedded in the polymeric layer. "Substantially embedded" as used herein refers to a reinforcing layer wherein at least 25%, such as at least about 50%, or even 100% of the total surface area of the reinforcing layer is embedded in a layer such as the polymeric layer or the fluoropolymer layer. In an embodiment, at least about 25%, or even about 50%, or even about 100% of the polymeric layer is directly in contact with the fluoropolymer layer. In an embodiment, the reinforcing layer may overlie the adhesive layer. In an embodiment, the reinforcing layer can be substantially embedded in the adhesive layer. The reinforcing layer can be any material that increases the reinforcing properties of the barrier structure. For instance, the reinforcing layer may include natural fibers, synthetic fibers, or combination thereof. In an embodiment, the fibers may be in the form of a knit, laid scrim, braid, woven, or non-woven fabric. Exemplary reinforcement fibers include glass, aramids, polyamides, polyesters, and the like. In an embodiment, the reinforcing layer may be selected in part for its effect on the surface texture of the barrier structure formed. The reinforcing layer may have a thickness of less than about 5.0 mm, such as not greater than about 2.0 mm.

Figure 1:
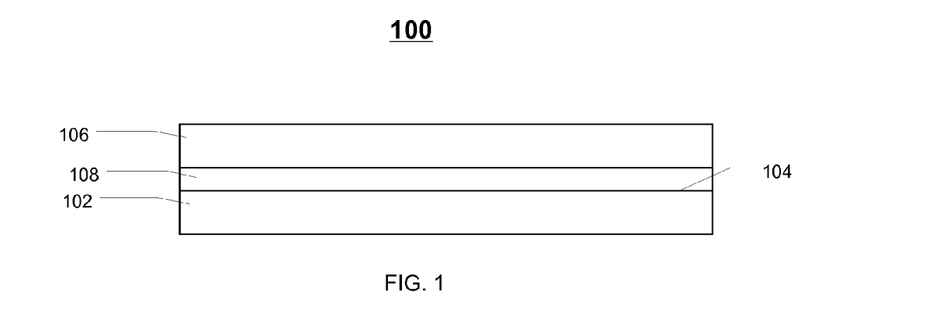
FIGS. 1, 2, 3, and 4 include illustrations of exemplary barrier structures.

An exemplary embodiment of a barrier structure 100 is illustrated in FIG. 1. The barrier structure includes fluoropolymer layer 102 having a major surface 104. A polymeric layer 106 overlies the major surface 104 of the fluoropolymer layer 102. In an embodiment, the barrier structure 100 may include a reinforcing layer 108 disposed between the fluoropolymer layer 102 and the polymeric layer 106. In an embodiment, the barrier structure 100 may include an adhesive layer (not shown) disposed between the fluoropolymer layer and the reinforcing layer.

Figure 2:
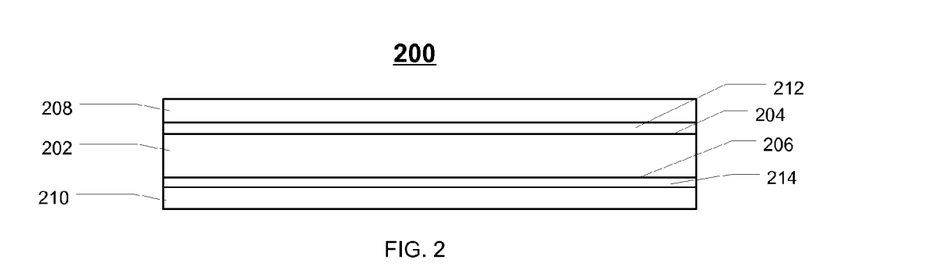

Another embodiment of a barrier structure 200 is illustrated in FIG. 2. The barrier structure includes a fluoropolymer layer 202 having a first major surface 204 and a second major surface 206. A first polymeric layer 208 overlies the first major surface 204 of the fluoropolymer layer 202. In an embodiment, a second polymeric layer 210 overlies the second major surface 206 of the fluoropolymer layer 202. The first polymeric layer 208 and the second polymeric layer 210 may be the same or different material. In an embodiment, the barrier structure 200 may include a first reinforcing layer 212 disposed between the fluoropolymer layer 202 and the first polymeric layer 208. In an embodiment, the barrier structure may further include a second reinforcing layer 214 disposed between the fluoropolymer layer 202 and the second polymeric layer 210. The first reinforcing layer 212 and the second reinforcing layer 214 may be the same or different material. In an embodiment, the barrier structure 200 may include an adhesive layer (not shown) disposed between the fluoropolymer layer and the first reinforcing layer 212 and/or the second reinforcing layer 214. The first adhesive layer and the second adhesive layer may be the same or different material. Any number of layers may be envisioned.

Figure 3:
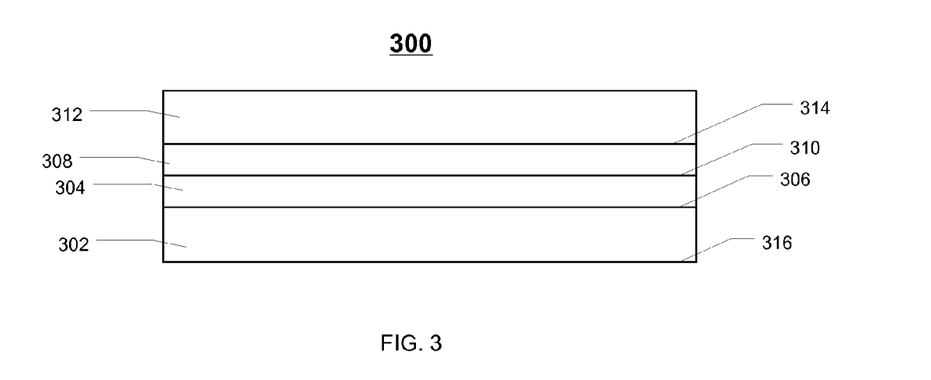

Another exemplary barrier structure is illustrated in FIG. 3 and is generally designated 300. The barrier structure includes fluoropolymer layer 302 and the adhesive layer 304 overlying a major surface 306 of the fluoropolymer layer 302. In an embodiment, the fluoropolymer layer 302 directly contacts the adhesive layer 304. As seen in FIG. 3, a reinforcing layer 308 directly contacts a major surface 310 of the adhesive layer 304. A polymeric layer 312 directly contacts a major surface 314 of the reinforcing layer 308. In a further embodiment, a second adhesive layer (not shown) may contact a second major surface 316 of the fluoropolymer layer 302. The first adhesive layer and the second adhesive layer may be the same or different material. In a further embodiment, the barrier structure may include a second polymeric layer (not shown) in contact with the second adhesive layer. The first polymeric layer and the second polymeric layer may be the same or different material. In another further embodiment, a second reinforcing layer (not shown) may be sandwiched between the second adhesive layer and the second polymeric layer. The first reinforcing layer and the second reinforcing layer may be the same or different material. In an embodiment, any number of layers may be envisioned.

Figure 4:
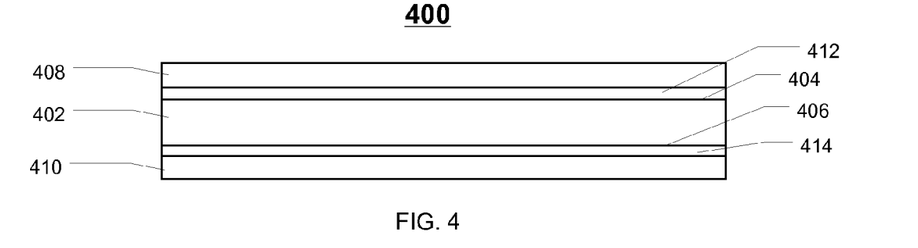

Another embodiment of a barrier structure 400 is illustrated in FIG. 4. The barrier structure includes a polymeric layer 402 having a first major surface 404 and a second major surface 406. A first fluoropolymer layer 408 overlies the first major surface 404 of the polymeric layer 402. In an embodiment, a second fluoropolymer layer 410 overlies the second major surface 406 of the polymeric layer 402. The first fluoropolymer layer 408 and the second fluoropolymer layer 410 may be the same or different material. In an embodiment, the barrier structure 400 may include a first adhesive layer 412 disposed between the polymeric layer 402 and the first fluoropolymer layer 408. In an embodiment, the barrier structure may further include a second adhesive layer 414 disposed between the polymeric layer 402 and the second fluoropolymer layer 410. The first adhesive layer 412 and the second adhesive layer 414 may be the same or different material. In an embodiment, the barrier structure 400 may include a reinforcing layer (not shown) disposed on the polymeric layer 402. In an embodiment, a reinforcing layer may be disposed between the polymeric layer 402 and the first fluoropolymer layer 408. In an embodiment, a reinforcing layer (not shown) may be disposed between the polymeric layer 402 and the second fluoropolymer layer 410. The first reinforcing layer and the second reinforcing layer may be the same or different material. Any number of layers may be envisioned.

In an embodiment, the barrier structure may be formed through a method that includes providing a fluoropolymer layer. Typically, the fluoropolymer layer may be extruded, cast, or skived. Further, the fluoropolymer layer that is provided has a surface that may be surface treated. In an embodiment, the method further includes C-treating, corona treating, plasma treating sodium treating, or combination thereof the surface of the fluoropolymer layer. In a particular embodiment, the method further includes C-treating the surface of the fluoropolymer layer. As stated earlier, C-treatment includes exposing at least one surface of the fluoropolymer layer to a corona discharge in an organic gas atmosphere. In an embodiment, the organic gas atmosphere includes acetone or an alcohol. In an embodiment, the organic gas is acetone. Typically, the organic gas is admixed with an inert gas such as nitrogen. The method further includes providing the polymeric layer. In an embodiment, the polymeric layer overlies and directly contacts the fluoropolymer layer without any intervening layer or layers. The polymeric layer may be processed. Processing of the polymeric layer, particularly thermoplastics, may include casting, extruding or skiving. In an embodiment, the polymeric layer may be embossed, textured, or otherwise surface treated in order to create desirable surface properties, such as a low friction surface. The reinforcing layer, if present, may be selected in part for its effect on the surface texture, which may also reduce the effective surface friction, for example. In an embodiment, the layers are typically heated to a temperature not greater than about 350° F. to form the barrier structure. In an embodiment, the layers are typically heated to a temperature not greater than about 300° F. to form the barrier structure.

In an embodiment, the barrier structure may include an adhesive layer. For instance, the adhesive layer may be applied to the fluoropolymer layer and subsequently applied to the polymeric layer. For instance, the adhesive layer may be extruded, melted, or laminated directly onto the fluoropolymer layer. For instance, the adhesive layer may be melted to a temperature to melt the adhesive layer, direct-extruded, or belt-laminated in any number of steps. In another embodiment, the adhesive layer may be applied to the polymeric layer and subsequently applied to the fluoropolymer layer. In an embodiment, the barrier structure may be formed through a method wherein the adhesive layer is extruded between the polymeric layer and the fluoropolymer layer. In an embodiment, the adhesive may be applied to both the polymeric layer and the reinforcing layer, which are subsequently applied to the fluoropolymer layer.

In an embodiment, the adhesive layer may be applied to the fluoropolymer layer in a liquid state and dried or cured. In an embodiment, the adhesive layer may be in a liquid molten state and then cooled and solidified. Drying or curing may occur at a sufficient temperature to adhere the adhesive layer to the fluoropolymer layer. For instance, the adhesive layer may be a polymer material suspended in an aqueous solution. In another embodiment, the adhesive layer may be colloidal silica suspended in an aqueous solution. The adhesive layer and fluoropolymer layer may then be adhered to the polymeric layer. In another embodiment, the adhesive layer may be applied to the polymeric layer in a liquid state and dried or cured. The adhesive and polymeric layer may then be adhered to the fluoropolymer layer.

The application of the adhesive layer is typically dependent upon the material used. For instance, a thermoplastic adhesive may be applied in one step, and the polymeric layer applied much later, or the assembly may be done in one pass. Where the adhesive layer is a thermoset material, the assembly is typically done in one process, with the liquid adhesive applied to one or more of the layers which are then brought together; heat may or may not be used to cure the thermosetting adhesive.

In an embodiment, the barrier structure may include a reinforcing layer. The method of disposing the reinforcing layer between the fluoropolymer layer and the polymeric layer is dependent upon the material of the reinforcing layer as well as the layers it directly contacts. Any suitable method may be envisioned. For instance, a commercially available material may be laid between the fluoropolymer layer and the polymeric layer prior to providing the polymeric layer. In an embodiment, a reinforcing layer may be provided within the polymeric layer, for instance a commercially available material may include a reinforcing layer substantially embedded within the polymeric layer. In an embodiment, a reinforcing layer may be provided within the adhesive layer. Subsequent heating of the barrier structure may adhere the layers.

Once the barrier structure is formed, the structure may be subjected to a seaming process. In an embodiment, two or more barrier structures may be seamed. For instance, overlapping marginal end regions of two structures and applying a seaming process typically produces a seam. Any seaming process that provides a seam between polymeric materials is envisioned. A typical seaming process includes thermal treatment. In an embodiment, the thermal seaming process occurs at a temperature such that the barrier structure does not degrade. In an embodiment, the thermal seaming process typically occurs at a temperature not greater than about 300° F. In an embodiment, the seaming process occurs at a temperature not greater than about 250° F. In an embodiment, the seaming process occurs at a temperature not greater than about 200° F. In an embodiment, the thermal treatment is at a temperature from about 250° F. to about 350° F. In an embodiment, the thermal treatment is at a temperature not greater than about 350° F. In an embodiment, the thermal treatment is at a temperature greater than about 180° F. In an embodiment, the thermal treatment is at a temperature not greater than about 400° F., such as at a temperature of about 180° F. to about 380° F. In an embodiment, the thermal treatment is at a temperature not greater than about 750° F. Further exemplary seaming construction methods include lap seaming or butt seaming using hot air seaming, high frequency seaming, RF welding, sewing, hot platen seaming, or adhesive tape seaming processes. In an embodiment, the barrier structure is thermobondable. In an exemplary embodiment, two or more barrier structures may be thermally bonded or welded. In an embodiment, the barrier structures are typically thermally bonded at a temperature not greater than the melt temperature of the fluoropolymer layer. For instance, the barrier structure is thermobondable at temperatures not greater than about 750° F., such as not greater than about 350° F., such as at temperatures not greater than about 300° F. In an exemplary embodiment, a thermoplastic polymer is disposed on both surface of the fluoropolymer layer and the barrier structure may be bonded to itself by thermal (contact, hot air, etc.) or RF welding methods, in order to fabricate articles.

Once formed, particular embodiments of the above-disclosed barrier structure advantageously exhibit desired properties such as improved chemical barrier properties and flammability resistance. In an embodiment, the barrier structure may have a chemical permeation breakthrough time of greater than about one hour for hazardous chemicals, as measured in accordance with ASTM F739. In an embodiment, the barrier structure may have a chemical permeation breakthrough time of greater than about three hours for hazardous chemicals, as measured in accordance with ASTM F739. In a further embodiment, the barrier structure meets the chemical permeation standards set by NFPA 1991 as measured in accordance with ASTM F 739. For example, the barrier structure meets the chemical permeation standards set by NFPA 1991 in Section 7.2.1 as measured in accordance with ASTM F 739 for hazardous chemicals such as acetone, acetonitrile, ammonia gas, 1,3-butadiene, carbon disulfide, chlorine gas, dichloromethane, diethylamine, dimethyl formamide, ethyl acetate, ethylene oxide, hexene, hydrogen chloride gas, methanol, methyl chloride gas, nitrobenzene, sodium hydroxide, sulfuric acid, tetrachloroethylene, tetrahydrofuran, and toluene. Chemical breakthrough time is defined as being the point at which the permeation rate reaches or exceeds 0.1 µg/cm$^2$/min. In an embodiment, the barrier structure has a chemical permeation breakthrough to Fuel B (a mixture of about 70% by volume isooctane and about 30% by volume toluene) of less than about 10 grams/meters$^2$/day as measured in accordance with ASTM D814-95.

In an embodiment, the barrier structures have a flammability resistance such that they do not ignite in the 3 second flame exposure component of ASTM F1358. In a further embodiment, the barrier structure meets the flammability resistance standards set by NFPA 1991. For example, the barrier structure meets the flammability resistance standards set by NFPA 1991 in Section 7.2.2 as measured in accordance with ASTM F1358 wherein suit materials shall not ignite during the initial 3-second exposure period, shall not burn a distance of greater than 100 mm (4 in.), shall not sustain burning for more than 10 seconds, and shall not melt as evidenced by flowing or dripping during the subsequent 12-second exposure period, i.e. no melt.

In an embodiment, the barrier structure may exhibit desirable anti-static properties. In a particular embodiment, the barrier structure may have a surface resistivity of less than about 10$^6$ Ohms, such as less than about 10$^5$ Ohms, as measured in accordance with ASTM D257.

In an exemplary embodiment, the barrier structure may exhibit desirable burst strength and puncture propagation tear resistance. For instance, the barrier structure may have a burst strength of at least about 200N, when tested in accordance with the ring clamp method in ASTM D751. In particular, the burst strength may be greater than about 200N, such as greater than about 300N, such as greater than about 500N, or even greater than about 600N. In an embodiment, the barrier structure may have a puncture propagation tear resistance of greater than about 49N, when tested in accordance with ASTM D2582. In particular, the puncture propagation tear resistance may be greater than about 60N, such as greater than about 100N, or even greater than about 150 N, as measured in accordance with ASTM D2582.

In an embodiment, the barrier structure may exhibit a desirable seam strength when seamed. For instance, the barrier structure may have a seam strength of greater than about 15 lb/in, such as greater than about 25 lb/in, or even greater than about 40 lb/in, when tested in accordance with ASTM D751.

In an embodiment, the barrier structure may exhibit a desirable cold bending moment. In particular, the cold bending moment may be not greater than about 0.050 Nm, such as not greater than about 0.025 Nm, or even not greater than about 0.010 Nm at −25° C., when tested in accordance with ASTM D747.

In an embodiment, the barrier structure may exhibit a desirable tensile strength. For instance, the barrier structure may have a tensile strength of at least about 1.5 kN/m, such as at least about 3.0 kN/m, when tested in accordance with ASTM D751. In an exemplary embodiment, the barrier structure has both a chemical permeation resistance of greater than about one hour for hazardous chemicals, when measured by ASTM F739, and a burst strength of at least about 200N, when measured by ASTM D751. In an exemplary embodiment, the barrier structure has both a chemical permeation resistance of greater than about one hour for hazardous chemicals, when measured in accordance with ASTM F739, and a tensile strength of at least about 3.0 kN/m, when measured in accordance with ASTM D751.

Barrier structures made of the layers described above may have numerous applications. In an embodiment, the barrier structure may be faced with thermoplastic polymers. As stated earlier, seams can be readily made with the barrier structures, making it suitable for fabrication into various articles that generally take advantage of their barrier properties. Manufacturing and materials selection flexibility imparted by relatively low temperature seaming methods, coupled with the chemical barrier properties of fluoropolymer films, is a novel contribution to many potential markets.

Applications include, for example, uses when the properties such as the above-mentioned burst strength, tensile strength, tear resistance, anti-static properties, chemical permeation, and/or flammability resistance are desired. For instance, the barrier structure may be used when a chemical and/or biological resistant material is desired. In an embodiment, exemplary barrier structures include shelters, liners, protective gear, clothing, and fluid containment systems. The structure may also possess other properties desired for any particular application envisioned. Furthermore, the barrier structures include architectural applications such as roofing, shelters, and shades. In a particular embodiment, the barrier structures may be used for applications such as antenna covers and packaging material.

In an embodiment, protective articles are made from the barrier structures, such as suits and soft shelters. The protective articles make use of particular embodiments' low permeability to hazardous chemicals. In an exemplary embodiment, the protective article has both a chemical permeation resistance of greater than about one hour for hazardous chemicals, when measured by ASTM F739, and a flame resistance of non-ignition in the 3 second flame exposure, when measured by ASTM F1358. Other properties such as flame resistance and mechanical properties are typically desired, as set out in specifications and industry standards such as NFPA 1991.

Containment articles, such as portable personal hydration systems, may be fabricated in whole or in part from these barrier structures. Such articles take advantage of the chemical barrier properties to protect the fluid within, while the surface polymeric layers may be selected as needed for appearance or performance, with the proviso that the interior facing polymeric layer must be suitable for contact with drinking water.

Other containment systems can be envisioned, wherever chemical or biological barrier properties are required, such as for transportation and/or storage of potentially hazardous chemical or biological materials. In an embodiment, the barrier structure has exemplary anti-static properties to chemical and/or hazardous materials. In a particular embodiment, the containment system can be used as liners for tanks that contain chemical and/or biological materials. For instance, exemplary tanks include septic tanks, fuel tanks, food tanks, water tanks, and the like. In an embodiment, the containment system can be a floating roof seal for tanks containing potentially hazardous materials.

EXAMPLES

Example 1

An exemplary barrier structure is made. The fluoropolymer layer is about 1.0 mil film obtained from Saint-Gobain Performance Plastics Corporation, similar to product DF1700 DB. The fluoropolymer layer is C-treated on both sides. An adhesive layer of an isocyanate adhesive film having about 1.0 mil thickness is on both the first major surface and the second major surface of the fluoropolymer. A reinforcing layer of flame retardant weft-inserted warp knit polyester (about 3.0 mil thick) is placed on an adhesive layer. A polymeric layer of store-bought PVC is on the reinforcing layer and the adhesive layer.

The barrier structure is tested for some of the key mechanical properties required by NFPA 1991—chemical permeability, burst strength, puncture propagation, seam strength, and flame resistance—and passed easily. Results can be seen in Table 1.

TABLE 1

| Test | NPFA 1991 spec | Result |
| --- | --- | --- |
| Chemical permeability | >1 hour | >3 hours |
| Burst strength | 200 N | 702 N |
| Puncture propagation | 49 N | 150 N |
| Seam Strength | 15 lb/inch | 42 lb/inch |
| Flame resistance | No ignition | No melt |

The properties of fluoropolymers and selection of polymeric materials for the polymer layer enable the structure to pass the flammability requirement as set in NPFA 1991. Further, the properties of fluoropolymers enable the structure to pass the chemical permeation requirement as set in NFPA 1991.

Example 2

An exemplary barrier structure is made. The fluoropolymer layer is a 1.0 (nominal) mil (0.0010") film obtained from Saint-Gobain Performance Plastics Corporation, product DF1700 DB. The fluoropolymer layer is C-treated. The adhesive layer is a polyurethane melt adhesive film having 2 mil thickness (Bemis 3206). The polymeric layer is store-bought PVC having a clear, shiny finish.

This combination is combined in a press for 60 seconds at about 50 psi. To obtain lasting bond strength between the fluoropolymer and the adhesive in excess of the fluoropolymer film yield strength, the adhesive layer can be heated to a temperature of about 300° F. for FEP and about 350° F. for the PFA side. (The fluoropolymer film yield strength is about 2.0 lb/inch such that in peeling, the fluoropolymer is irreversibly stretched to a large degree or torn.) Good bonding to the PVC is observed from 250° F. The lamination can be accomplished in one step since the PVC does not appear to melt under these conditions.

Example 3

A barrier structure is made using the conditions from Example 2 with the following variations. "ST-3477 polyurethane" is the polymeric layer (obtained from Stevens Urethane), the Bemis 3206 adhesive is first bonded to the DF1700 DB as above, and then the polyurethane polymeric layer is laminated to the adhesive in a separate step at a lower temperature and pressure (25 psi). Heating at a temperature of 300° F. and some melting of the polyurethane results in a good bond.

Example 4

Specimens of the following materials are made for full mechanical testing. The fluoropolymer layer is 1.0 mil of C-treated DF1700 DB. The adhesive layer is polyurethane Bemis 3206 at a thickness of 2.0 mils. For one barrier structure, the substrate layer is polyvinylchloride (PVC) from Plastic Film Corporation, weight 12, hardness "3H" having a matte finish. For the second barrier structure, the polymeric layer is polyvinylchloride (PVC) from Plastic Film Corporation, weight 12, hardness "2S" having a matte finish. The two structures are made on a belt. Conditions are at a temperature of 350° F.; speed: 3 ft/min (over three 1' long heated platens); a light nip pressure is applied downstream of the platens.

The two barrier structures are tested for some of the key mechanical properties required by NFPA 1991—burst, tear propagation, cold bending moment—and passed easily. Results can be seen in Table 2.

TABLE 2

|  | Burst strength (N) ASTM D751 - ring clamp method | Tear resistance (N) ASTM D2582 | Cold bending moment (ft-lb) ASTM D747 at −25° C. |
| --- | --- | --- | --- |
| NPFA 1991 spec | 200 N minimum | 49 N minimum | 0.057 maximum |
| 2S laminate | 532 | n/a | n/a |
| 3H laminate | 677 | 111 | 0.045 |

The properties of fluoropolymers and selection of polymeric materials for the polymer layer enable the structures to pass the flammability requirement as set in NPFA 1991. Further, the properties of fluoropolymers enable the structures to pass the chemical permeation requirement as set in NFPA 1991.

Example 5

Two exemplary structures are made. The fluoropolymer layer is PVDF with a 80/20 by weight ratio of PVDF/PVC as the adhesive layer. The polymeric layer is PVC with a subsequent layer of PVC fabric coated with polyester (Seaman 8028). The PVC used in the adhesive layer and as the polymeric layer is Geon® 552 for the first barrier structure and Geon® 576 for the second barrier structure. The film of PVDF is cast on a 2 mil thick Melinex S carrier (size 2×4 inches). Two coats of PVDF compounded latex are applied, dried 2 minutes at 250° F. and fused 30 seconds at 400° F. The PVDF/PVC tie layer is applied to the PVDF layer, dried, and fused as above. The PVC layer is applied by a free dip and dried for 2 minutes at 250° F. This layer is fused during the drying step. This film is bonded to the PVC coated fabric in a foot press at 300° F. (1 minutes, 40 psig). The first barrier structure results in a good bond. The second barrier structure has an excellent bond to the PVC coated fabric however, the PVC polymeric layer is cracked.

Example 6

Multiple barrier structures are prepared with different PVDF/PVC ratios and diluted polymeric layer. The fluoropolymer layer is PVDF, the adhesive layer is PVDF/PVC, and the polymeric layer is PVC from Geon® 576. The PVDF/PVC ratios are 80/20, 85/15, and 90/10. The film of PVDF is cast on a 2 mil thick Melinex S carrier (size 2×4 inches) by free dipping two layers, drying 2 minutes at 250° F. and fused 30 seconds at 390°-400° F. The PVDF/PVC tie layer is applied to the PVDF layer, dried, and fused as above. The PVC layer is applied by a free dip and dried for 2 minutes at 250° F. This layer is fused during the drying step. This film is bonded to the PVC coated fabric in a foot press at 350° F. (1 minutes, 40 psig) and placed between two 5-mil thick Kapton FIN films. In all cases, the bond of the film exceeds its tensile strength.

Example 7

A barrier structure from a fluoropolymer layer of PVDF, 80/20 by weight ratio PVDF/PVC adhesive layer, and PVC polymeric layer is produced on a pilot tower. The carrier used is 5 mil Kapton FIN, 10 in. wide. The running conditions are: drying zone set point of 250° F.; fusing zone set point of 400° F.; web speed of 7 fpm; bars are size 28 (grooved). The barrier structure is then bonded to PVC coated with polyester (Seaman 8028). In this case, the bond of the film to the coated PVC fabric exceeds the film strength.

Example 8

A barrier structure using a C-treatment on the fluoropolymer is obtained from Saint-Gobain Performance Plastics Corporation, product DF1100. The barrier structure shows good adhesion to materials such as polyurethane (Bemis 6329) and liquid silicone rubber.

Example 9

The fluoropolymer layer is a 1.0 (nominal) mil film, DF1700 DB available from Saint-Gobain Performance Plastics Corporation. The fluoropolymer layer is C-treated on one or both sides. An adhesive layer of Adcote 331 (available from Rohm and Haas) is coated onto the C-treated layer(s) at a wet thickness of 3 mil and dried at 100° C. for 5 minutes. A polymeric layer of ST-3447 thermoplastics polyurethane (available from Stevens Urethane) is calendered onto the adhesive layer. After curing the adhesive layer at 120° F. for 24 hours then aging for one week, the peel strength of the polyurethane from the C-treated fluoropolymer surface is over 2 lb/inch.

Example 10

The fluoropolymer layer is a 1.0 (nominal) mil film, DF1700 DB available from Saint-Gobain. The fluoropolymer layer is C-treated on one or both sides. An adhesive layer of Adcote 331 (available from Rohm and Haas) is coated onto the C-treated layer(s). The adhesive dried at 100° C. for 5 minutes, then cured at 120° F. for 24 hours leaving a non-tacky surface. One week later a polymeric layer of ST-3447 thermoplastics polyurethane (available from Stevens Urethane) is laminated to the cured, adhesive-coated surface in a press (320° F., 1 minute, 50 psi). The peel strength, measured the next day, is 2.16 lb/inch.

Example 11

An exemplary barrier structure is made. The fluoropolymer layer is a cast film of about 1.4 mil obtained from Saint-Gobain Performance Plastics Corporation, similar to product DF1700 DB. The fluoropolymer layer is C-treated on both sides. An adhesive layer of thermoset adhesive coating having a thickness of about 0.1 mil to about 0.6 mil is on both the first major surface and the second major surface of the fluoropolymer. A polymeric layer of a polyurethane film is on the first and second adhesive layers having a thickness of about 12.0 mil (obtained from JP Stevens). The peel strength is 4.5 pounds/inch as measured by ASTM D4851-88. The permeation rate to Fuel B (a mixture of about 70% by volume isooctane and about 30% by volume toluene) is less than about 10 grams/m$^2$/day as measured by ASTM D814-95.

Example 12

An exemplary barrier structure is made. The fluoropolymer layer is a cast film of about 1.4 mil obtained from Saint-Gobain Performance Plastics Corporation, similar to product DF1700 DB. The fluoropolymer layer is C-treated on both sides. An adhesive layer of thermoset adhesive film having a thickness of about 0.1 mil to about 0.6 mil is on both the first major surface and the second major surface of the fluoropolymer. A polymeric layer of a non-woven high density polyethylene film of about 4.0 mil is on the first and second adhesive layers. The peel strength is 4.0 pounds/inch as measured by ASTM D4851-88

Examples 13

An exemplary barrier structure is made. The fluoropolymer layer of an extruded copolymer of ethylene tetrafluoroethylene (ETFE) is a film having a thickness of about 3.0 mil obtained from Saint-Gobain Performance Plastics Corporation. The fluoropolymer layer is corona treated on both sides. An adhesive layer of thermoset adhesive film having a thickness of about 0.1 mil to about 0.6 mil is on both the first major surface and the second major surface of the fluoropolymer. A polymeric layer of a polyurethane film having a thickness of about 12.0 mil from Bayer Material Science is on the first and second adhesive layers. The peel strength is over 4.0 pounds/inch as measured by ASTM D4851-88.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A barrier structure comprising:
 a fluoropolymer layer having a major surface, wherein the major surface is surface treated;
 a polymeric layer overlying the major surface of the fluoropolymer layer; and
 an adhesive layer disposed between the fluoropolymer and the polymeric layer, wherein the adhesive layer consists essentially of a thermoset polyurethane;
 wherein the barrier structure is thermally seamable at a temperature not greater than about 300° F.; and
 wherein the barrier structure has a chemical permeation breakthrough detection time greater than about one hour for hazardous chemicals as measured by ASTM F739.

2. The barrier structure of claim 1, wherein the fluoropolymer includes fluorinated ethylene propylene copolymer (FEP), a copolymer of ethylene tetrafluoroethylene (ETFE), a copolymer of tetrafluoroethylene and perfluoropropyl vinyl ether (PFA), a copolymer of ethylene and chlorotrifluoroethylene (ECTFE), a copolymer of tetrafluoroethylene and perfluoromethyl vinyl ether (MFA), poly vinylidene fluoride (PVDF), a terpolymer of tetrafluoroethylene, hexafluoropropylene, and vinylidenefluoride (THV), or mixtures thereof.

3. The barrier structure of claim 1, wherein the polymeric layer is a thermoset material or a thermoplastic material.

4. The barrier structure of claim 3, wherein the polymeric material includes a polyolefin, a polypropylene, a polyamide, a polyester, a polyvinyl chloride, or a polyurethane.

5. The barrier structure of claim 1, wherein the thermoset polyurethane includes a crosslinking component.

6. The barrier structure of claim 1, further comprising a reinforcing layer disposed between the fluoropolymer layer and the polymeric layer.

7. The barrier structure of claim 1, further comprising a second polymeric layer overlying a second major surface of the fluoropolymer layer.

8. The barrier structure of claim 7, further comprising a reinforcing layer disposed between the fluoropolymer layer and the second polymeric layer.

9. The barrier structure of claim 1, further comprising a second fluoropolymer layer wherein the polymeric layer is disposed between the first fluoropolymer layer and the second fluoropolymer layer.

10. The barrier structure of claim 1, having a flame resistance that meets NFPA 1991 standards as measured in accordance with ASTM F1358.

11. The barrier structure of claim 1, wherein the barrier structure does not degrade by the thermal seaming process.

12. The barrier structure of claim 1, wherein the barrier structure is a protective clothing, a protective shelter, or a containment system.

13. A barrier structure comprising:
a fluoropolymer layer of a copolymer of ethylene tetrafluoroethylene (ETFE) having a major surface, wherein the major surface is surface treated;
a polymeric layer overlying the major surface of the fluoropolymer layer; and
an adhesive layer disposed between the fluoropolymer and the polymeric layer, wherein the adhesive layer consists essentially of a thermoset polyurethane;
wherein the barrier structure is thermally seamable at a temperature not greater than about 300° F.; and
wherein the barrier structure has a chemical permeation breakthrough detection time greater than about one hour for hazardous chemicals as measured by ASTM F739.

14. A method of forming a barrier structure comprising:
providing a fluoropolymer layer having a first major surface and a second major surface, wherein at least the first major surface of the fluoropolymer is surface treated;
providing an adhesive layer overlying the first major surface of the fluoropolymer, wherein the adhesive layer consists essentially of a thermoset polyurethane; and
providing a polymeric layer overlying the adhesive layer;
wherein the barrier structure is thermally seamable at a temperature not greater than about 300° F.; and
wherein the barrier structure has a chemical permeation breakthrough detection time greater than about one hour for hazardous chemicals as measured by ASTM F739.

15. The method of claim 14, further comprising heating the barrier structure to a temperature not greater than about 350° F.

16. The method of claim 14, wherein the first major surface of the fluoropolymer is surface treated with C-treatment, corona treatment, plasma treatment, sodium etching, or combinations thereof.

17. The method of claim 14, wherein the fluoropolymer includes fluorinated ethylene propylene copolymer (FEP), a copolymer of ethylene tetrafluoroethylene (ETFE), a copolymer of tetrafluoroethylene and perfluoropropyl vinyl ether (PFA), a copolymer of ethylene and chlorotrifluoroethylene (ECTFE), a copolymer of tetrafluoroethylene and perfluoromethyl vinyl ether (MFA), poly vinylidene fluoride (PVDF), a terpolymer including tetrafluoroethylene, hexafluoropropylene, and vinylidenefluoride (THV), or mixtures thereof.

18. The method of claim 14, wherein the polymeric layer is a thermoset material or a thermoplastic material.

19. The method of claim 18, wherein the polymeric layer includes a polyolefin, a polypropylene, a polyamide, a polyester, a polyvinyl chloride, or a polyurethane.

20. The method of claim 14, wherein the adhesive thermoset material includes a crosslinking component.

21. The method of claim 14, further comprising providing a reinforcing layer disposed between the fluoropolymer layer and the polymeric layer.

22. The method of claim 14, further including the step of seaming the article at a temperature not greater than about 300° F.

23. The method of claim 14, further comprising providing a second polymeric layer overlying the second major surface of the fluoropolymer layer.

24. The method of claim 14, further comprising providing a second fluoropolymer layer wherein the polymeric layer is disposed between the second fluoropolymer layer and the first fluoropolymer layer.

* * * * *